3,179,608
ALKYD RESIN WITH FUNGICIDAL PROPERTY
Ronald L. Broadhead, Park Forest, Ill., assignor to Standard Oil Company, Chicago, Ill., a corporation of Indiana
No Drawing. Filed May 31, 1960, Ser. No. 32,552
5 Claims. (Cl. 260—22)

This invention relates to alkyd resins of improved resistance to fungicidal attack and particularly to a particular resin possessing fungicidal activity.

Alkyd resins utilized for surface coating properties, particularly outdoor exposure, are subject to attack by fungus. These attacks not only cause deterioration of the coating but impart an unsightly appearance to the coating even before substantial deterioration thereof. This attack is combatted at this time by dissolving in the paint a material such as pentachlorophenol. Unfortunately, these materials, being in simple solution, are fairly rapidly leached out of the coating and also frequently are not uniformly distributed over the entire surface being protected.

An object of the invention is a (polyester) alkyd resin possessing fungicidal activity as an integral part of the resin structure. A further object is an alkyd resin suitable for surface coating work containing in solution another resin possessing fungicidal activity to impart satisfactory fungicidal activity to the entire resin composition. Other objects of the invention will become apparent in the course of the description of the invention.

It has been discovered that a resin possessing fungicidal activity can be prepared by the polycondensation reaction of a glycol, hereinafter defined, or a dihydroxy group affording material, hereinafter defined, with an ester of a chlorophenol and a benzene carboxylic acid which ester contains at least 2 free-carboxyl groups.

This fungicidal resin may be used as an additive with ordinary oil modified alkyd resins to impart fungicidal activity to the resin composition.

An oil-modified alkyd resin derived from benzene polycarboxylic acids containing 3–4 carboxyl groups possessing suitable fungicidal activity can be prepared by utilizing chlorophenol as one of the reactants.

The oil modified fungicidal resin can be used along with solvents, pigments, extenders, dyes, etc. to form surface coating compositions where a maximum of fungicidal activity is desired. The fungicidal resin-alkyd resin solution and the chlorophenol modified oil modified benzene polycarboxylic acid type resin can also be used with the conventional solvents, pigments, etc. to produce surface coatings of satisfactory fungicidal activity having a life substantially that of the surface coating itself.

The benzene carboxylic acid includes not only those having a single phenyl nucleus but also those having a diphenyl nucleus and also those having another group positioned between the two phenyl groups in the diphenyl nucleus.

The tricarboxylic acid present may be trimellitic acid, trimellitic anhydride, hemimellitic acid, hemimellitic anhydride, trimesic acid, benzophenone tricarboxylic acid, diphenyltricarboxylic acid, etc.

The benzene tetracarboxylic acid may be pyromellitic acid, pyromellitic dianhydride, a diphenyltetracarboxylic acid (anhydride), diphenylmethane tetracarboxylic acid (anhydride), benzophenone tetracarboxylic acid (anhydride), diphenylsulfone tetracarboxylic acid (anhydride), etc.

The benzene dicarboxylic acid may be one of the unsubstituted acids, i.e., phthalic acid, phthalic anhydride, isophthalic acid and terephthalic acid or alkyl substituted acid where the alkyl contains 1–8 carbon atoms, such as t-butylisophthalic acid, isooctylphthalic acid, dimethylterephthalic acid, methylphthalic anhydride or a halo substituted acid, such as, chlorophthalic acid, dichloroterephthalic acid, bromophthalic anhydride, and iodoisophthalic acid or diphenyldicarboxylic acid, benzophenone dicarboxylic acid, etc.

Besides the defined benzene carboxylic acids or anhydrides, there may be used the corresponding benzene carboxylic acid halides, particularly the chlorides.

The fungicidal activity of resin is imparted by chlorophenol reacted with a carboxyl group on the benzene polycarboxylic acid containing 3–4 carboxyl groups. These phenols contain not only the chloro substituent(s) but may also contain one or more alkyl substituents. Illustrative chlorophenols are hydroxybenzene containing 1–5 chloro groups; chlorocresols containing 1–4 chloro groups; and chloroxylenols containing 1–3 chloro groups. Pentachlorophenol (pentachlorohydroxybenzene) is preferred.

The defined chlorophenol and the benzene polycarboxylic acid are reacted in a mole ratio such that at least 2 of the carboxyl groups are not esterified. For example, when utilizing trimellitic anhydride as the acid, 1 mole of chlorophenol is esterified with 1 mole of trimellitic anhydride. When utilizing benzophenone tetracarboxylic acid as the acid, from 1 to 2 moles of chlorophenol may be reacted with the acid.

When a film-forming resin is desired having only the minimum amount of fungicidal activity or for uses not requiring the maximum activity imparted by the presence of chlorophenol in the amounts set out in the preceding paragraph, less chlorophenol may be utilized; in such a case an alkanol modifier or a hereinafter defined polyalkylene glycol monoalkyl ether modifier is used to form the ester of the defined benzene polycarboxylic acid of 3–4 carboxyl groups. In any event, the resin wherein, in effect, the chlorophenol is present as a modifier should contain an amount of chlorophenol such that there is imparted to the resin a chlorine content of at least about 0.25 weight percent, calculated as pentachlorophenol, and based upon the modified resin. In general, a chlorine content of this amount will impart fungicidal protection for about the same length as the probable life of the surface coating afforded by the modified resin.

The glycol is preferably an alkylene glycol containing from 2 to about 20 carbon atoms. It is to be understood that the term alkylene glycol includes not only those glycols containing only hydroxyl groups but also those including an ether linkage as well as hydroxyl groups. Exceptional results are obtained using the alkanediols containing from 2 to 8 carbon atoms. Illustrative glycols suitable for use in the invention are: ethylene glycol, propylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, 1,3-butanediol, 2,3-butanediol, 2,4-pentanediol, 2-methyl-2,4-pentanediol, 2,3-dimethyl-2,3-butanediol, 2,2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, and tripropylene glycol.

The ester of the defined acidic member and the defined chlorophenol is condensed in a polyesterification condensation reaction with a material affording two hydroxyl groups per molecule. It will be evident from the following disclosure that this hydroxyl group affording material will provide two hydroxyl groups per molecule only as an average of the molecules in the material. When this material is an alcoholysis product, there may be on the average somewhat more than two hydroxyl groups per molecule; it is intended that this material in effect functions as a dihydric alcohol.

The dihydroxyl group affording material may be an ester of a polyethenenoid fatty acid containing at least about 10 carbon atoms and a polyhydric paraffinic alcohol (alkane polyol) containing 3–4 hydroxyl groups. The polyhydric alcohols include glycerol, erythritol, pentaerythritol, threitol, dipentaerythritol, and trimethylol propane. The polyethenoid fatty acid contains at least two olefinic bonds and contains at least about 10 carbon atoms. The fatty acids containing 16–24 carbon atoms are particularly suitable. Illustrative fatty acids are: linoleic, hirogonic, eleostearic, moroctic, arachidonic, clupanodonic, and nisinic. An economical and prefered source of acids are the natural mixtures of acids obtained from drying fatty oils such as linseed oil, soya oil, tung oil, etc. When the defined polyol is glycerol, the ester charged to the reaction zone is properly termed a monoglyceride of the particular fatty acid. For convenience, the term monoglyceride is utilized to describe this ester even when the polyol utilized in the formation of the ester is some other three or four hydroxyl group containing polyol.

Instead of more or less pure monoglyceride the dihydroxyl group affording material may be the alcoholysis product of the hereinabove defined polyol and a drying fatty oil. When the polyol used in the alcoholysis reaction is glycerol, then the alcoholysis product will be a monoglyceride of the polyethenoid fatty acids contained in the drying oil and also of the other fatty acids contained in the drying oil and nonreactive materials. When the reacting polyol is other than glycerol, the alcoholysis product will be a mixture of true glycerides and glyceridetype esters of the various acids and the reacting polyol. Sufficient reacting polyols are utilized in the alcoholysis reaction to have in the alcoholysis product compounds affording on the average two hydroxyl groups per molecule.

Any of the drying oils containing polyethenoid fatty acid esters, whether of vegetable or marine life origin, may be utilized. Illustrative of these drying oils are: linseed, soybean, tung, castor, dehydrated castor, oiticica, perilla, safflower, menhaden, and sardine.

When special properties are desired, the dihydroxyl group affording material may be a mixture of one or more of the various monoglycerides or a mixture of monoglyceride with an alcoholysis product or a mixture of alcoholysis product from two or more fatty oils, etc.

An alkanol modifier may be present in forming the alkyd resin from benzene tri- and tetracarboxylic acids. These alkanols preferably contain from 4 to 36 carbon atoms. Illustrative are ethanol, n-butanol, hexanol, n-octanol, isooctyl, decanol, decyl, tridecyl, myristyl, cetyl, stearyl, docosanol, ceryl, myricyl and hexatriacontyl alcohol.

A polyalkylene glycol monoalkyl ether modifier may be present in forming the alkyl resin from benzene tri- and tetracarboxylic acid. This ether preferably contains from 2 to 8 ether groups; each alkylene unit present in the ether contains from 2 to 3 carbon atoms, i.e., the alkylene units are either ethylene or propylene; the alkyl group present in the ether contains from 1 to 8 carbon atoms. Numerous species of the defined ethers are available commercially under the "Carbitol" trade name. Specifically, the defined ethers are known as alkyl Carbitols. The Carbitols are alkylation reaction products of ether glycols and alkanols. Illustrative ether glycols are diethylene glycol, triethylene glycol, tetraethylene glycol, and polyethylene glycols containing not more than 8 ether linkages; dipropylene glycol, tripropylene glycol, and polypropylene glycols containing not more than 8 ether linkages. Illustrative alkanols are methanol, ethanol, isopropanol, n-butanol, t-butyl alcohol, and octanol. The mixtures of isomeric alkanols prepared by the Oxo process are particularly suitable, especially isooctyl alcohol. Illustrative of the nomenclature utilized herein is the alkylation product of diethylene glycol with ethanol which product is known as diethylene glycol monoethyl ether or 2-(2-ethoxyethoxy) ethanol or ethyl Carbitol.

The condensation reaction is carried out under more or less conventional conditions for polyesterification-condensation reactions. The reaction zone is vigorously agitated to improve contacting while the temperature is maintained between about 125° C. and 225° C., commonly on the order of 170° C. Water produced in the reaction is continuously withdrawn. The time of reaction is determined by the type of reactants and the temperature of reaction.

When the fungicidal resin is utilized as an additive for imparting fungicidal activity to other alkyd resins, the fungicidal resin is dissolved in the alkyd resin to be protected. This may be done by adding the fungicidal resin to the cooking vessel at the completion of the alkyd resin reaction. Or the fungicidal resin may be added to a solution of the resin to be protected in an organic solvent of the type commonly used for this purpose. In any event, sufficient fungicidal resin is added to the resin to be protected to impart a chlorine content of at least about 0.25 weight percent, calculated as pentachlorophenol, based upon the resin to be protected. The fungicidal resin, either the polyester derived from glycol reactant or the oil-modified alkyd resin form, is soluble in ordinary alkyd resins and organic solvents and there is no problem with respect to introducing the fungicidal resin into true solution with the alkyd resin to be protected.

The fungicidal resin may be added to a conventional oil-modified alkyd resin. These resins are the polyesterification condensation reaction products of polyhydric alcohols, unsaturated fatty acid, and benzene polycarboxylic acid containing 2, 3, or 4 carboxyl groups; the resin usually having an acid number of not more than about 20.

The polyhydric alcohol may be any one of the alcohols which contain at least two hydroxyl groups. Examples of typical polyhydric alcohols which have been used in the preparation of alkyd resins and may be used herein are glycerol, trimethylol propane, pentaerythritol, dipentaerythritol, sorbitol and mannitol. In addition to these polyhydric alcohols, diols may be used, such as ethylene glycol, propylene glycol, diethylene glycol, dipropylene glycol, tetraethylene glycol, etc.

The unsaturated fatty acid includes the fatty oils (drying oils) commonly used in alkyd resin preparation. The fatty acid contains at least two olefinic bonds and at least about 10 carbon atoms. The fatty acids containing 16–24 carbon atoms are particularly suitable. Illustrative fatty acids are: linoleic hiragonic, eleostearic, moroctic, arachidonic, clupanodonic, and nisinic. Economical and preferred sources of acids are the natural mixtures of acids obtained from drying (fatty) oils such as linseed oil, soya oil, tung oil, etc. Any of the drying oils containing fatty acid esters, whether of vegetable or marine life origin, may be utilized. Illustrative of these drying oils are: linseed soybean, tung, castor, dehydrated castor, oiticica, perilla, safflower, menhaden, and sardine.

Numerous illustrations of commonly used phthalic acids are set out in Organic Coating Technology, volume 1 (1954), by H. F. Payne. Chapters 7 and 8 are directed to alkyd resins and their various modifications. Illustrations of oil-modified alkyd resins from trimellitic anhydride are U.S. Patents Nos. 2,856,374 and 2,860,113.

The fungicidal resin may be adjusted in composition to have an acid number, for example, above about 30, so that it may be converted to water soluble form by treatment with material such as aqueous ammonia, alkanolamines, lower molecular weight alkanolamines, or heteroamines. The water soluble form may be utilized as such in protecting surface coatings prepared from water emulsions or alkyd resins or utilized along with water soluble oil-modified alkyd resins.

*Example*

Butyl carbitol (48.60 grams—0.30 mole), linseed fatty alcohols (48.0 grams—0.18 mole), and pentachlorophenol (5.32 grams—0.02 mole) were heated together to 40° C. at which stage all the pentachlorophenol had dissolved. Heating was continued until the charge temperature was 100° C. whereupon 96.03 grams of trimellitic anhydride (0.50 mole) were added. After 5 minutes heating and stirring at 81–100° C., a sample of the charge gave a positive purple-pink color with ferric chloride showing that phenolic hydroxyl groups still were present. The charge temperature was held at 100–120° C. for 1 hour and 10 minutes and then was raised to 160° C. in an additional 25 minutes. At this stage, a sample of the charge no longer gave a positive test for phenolic hydroxyl groups showing that essentially all of the pentachlorophenol had reacted with the trimellitic anhydride. At this point, 238.4 grams of a mixed linseed ester, obtained by ester interchanging 1206 grams of linseed oil with 296 grams of pentaerythritol, were added. The charge temperature was raised to 172° C. in 30 minutes and held at 170–180° C. for about 5½ hours at which point the charge began to thicken rapidly so the reaction was stopped. Acid number of viscous resin was 51.8. It is soluble in both aqueous amine solution and xylene.

Thus having described the invention, what is claimed is:

1. A resin possessing fungicidal activity which resin consists essentially of the condensation reaction product of (A) an ester containing at least 2 free-carboxyl groups of (i) an acidic member selected from the class consisting of benzene carboxylic acids containing 3–4 carboxyl groups, anhydrides thereof and acid halides thereof and (ii) a chlorophenol selected from the class consisting of phenol, cresol and xylenol, each having substituted on the ring from 1 to the full substitution number of chlorine atoms, and (B) a dihydroxyl group affording material selected from the class consisting of (i) glycol containing from 2 to about 20 carbon atoms and (ii) (a) the hydroxyl group containing ester of a polyethenoid fatty acid containing at least about 10 carbon atoms and a polyhydric paraffinic alcohol containing 3–4 hydroxyl groups, (b) the alcoholysis product of a drying fatty oil and a polyhydric paraffinic alcohol containing 3–4 hydroxyl groups and (c) mixtures thereof, said dihydroxyl material being present in an amount to react with the free-carboxyl groups present, with continuous withdrawal of water of reaction until condensation is essentially complete, to obtain an oil-soluble resin product.

2. The resin of claim 1 wherein said acidic member is trimellitic anhydride.

3. The resin of claim 1 wherein said chlorophenol is pentachlorophenol.

4. The resin of claim 1 wherein said glycol is 1,4-butanediol.

5. The resin of claim 1 wherein said polyhydric alcohol is pentaerythritol and said oil is linseed oil.

References Cited by the Examiner

UNITED STATES PATENTS

| | | | |
|---|---|---|---|
| 2,621,168 | 12/52 | Ross et al. | 260—47 |
| 2,759,903 | 8/56 | Epstein et al. | 106—15 |
| 2,789,060 | 4/57 | Spangenberg et al. | 106—15 |
| 2,822,378 | 2/58 | Bader | 260—475 |
| 2,856,374 | 10/58 | Bolton | 260—22 |
| 2,957,837 | 10/60 | Smith et al. | 260—22 |
| 3,135,771 | 6/64 | Renckhoff et al. | 260—22 |

LEON J. BERCOVITZ *Primary Examiner.*

A. D. SULLIVAN, MILTON STERMAN, *Examiners.*